United States Patent
Cao et al.

(10) Patent No.: US 9,001,832 B2
(45) Date of Patent: *Apr. 7, 2015

(54) METHOD, DEVICE AND SYSTEM FOR ESTABLISHING PSEUDO WIRE

(71) Applicant: Huawei Technologies Co., Ltd., Shenzhen (CN)

(72) Inventors: Wei Cao, Beijing (CN); Mingming Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/218,019

(22) Filed: Mar. 18, 2014

(65) Prior Publication Data

US 2014/0198797 A1 Jul. 17, 2014

Related U.S. Application Data

(63) Continuation of application No. 12/982,571, filed on Dec. 30, 2010, now Pat. No. 8,718,062, which is a continuation of application No. PCT/CN2009/071904, filed on May 21, 2009.

(30) Foreign Application Priority Data

Jul. 17, 2008 (CN) .......................... 2008 1 0141666
Aug. 29, 2008 (CN) .......................... 2008 1 0214839

(51) Int. Cl.
*H04L 12/28* (2006.01)
*H04L 12/741* (2013.01)
(Continued)

(52) U.S. Cl.
CPC ............ *H04L 45/74* (2013.01); *H04L 12/4633* (2013.01); *H04L 45/00* (2013.01); *H04L 45/50* (2013.01); *H04L 45/68* (2013.01); *H04L 2212/0025* (2013.01)

(58) Field of Classification Search
None
See application file for complete search history.

(56) References Cited

U.S. PATENT DOCUMENTS 7,440,438 B2 * 10/2008 Ould-Brahim et al. ....... 370/344
7,613,188 B1 11/2009 French et al.
(Continued)

FOREIGN PATENT DOCUMENTS

| CN | 101001196 A | 7/2007 |
|---|---|---|
| CN | 101159668 A | 4/2008 |
| CN | 101212400 A | 7/2008 |

OTHER PUBLICATIONS

Andersson et al., "LDP Specification" Network Working Group, Jan. 2001, 118 pages.
(Continued)

*Primary Examiner* — Phirin Sam
(74) *Attorney, Agent, or Firm* — Brinks Gilson & Lione

(57) ABSTRACT

A method for establishment a pseudo wire (PW) is disclosed, including: receiving a first label mapping (LM) message, where the first LM message carries a PW ID, PW parameters, and label switching path (LSP) tunnel information that are selected by the sender of the first LM message; matching a local PW according to the PW ID; performing parameter negotiation of the local PW according to the PW parameters; matching a local tunnel according to the LSP tunnel information; binding the local tunnel and the local PW when the matching between the PW ID and the LSP tunnel information is successful; and establishing a PW when the parameter negotiation is successful. A device and system for establishing a PW are also disclosed. With the present invention, a PW service is associated with an LSP tunnel to improve the reliability of the information transmission process.

10 Claims, 11 Drawing Sheets

(51) Int. Cl.
*H04L 12/46* (2006.01)
*H04L 12/701* (2013.01)
*H04L 12/723* (2013.01)
*H04L 12/721* (2013.01)

(56) References Cited

U.S. PATENT DOCUMENTS

| | | | |
|---|---|---|---|
| 7,643,499 B2 * | 1/2010 | Rajsic | 370/401 |
| 7,782,847 B2 | 8/2010 | Hua et al. | |
| 7,801,138 B2 * | 9/2010 | Du et al. | 370/392 |
| 7,873,053 B2 | 1/2011 | Papadimitriou | |
| 7,965,656 B1 | 6/2011 | Wijnands et al. | |
| 8,068,486 B2 | 11/2011 | Liu et al. | |
| 8,295,278 B2 * | 10/2012 | Shah et al. | 370/389 |
| 8,503,321 B2 * | 8/2013 | Krzanowski | 370/252 |
| 8,743,886 B2 * | 6/2014 | Pati et al. | 370/395.5 |
| 2004/0004955 A1 | 1/2004 | Lewis | |
| 2004/0233891 A1 | 11/2004 | Regan et al. | |
| 2005/0213513 A1 | 9/2005 | Ngo et al. | |
| 2006/0013142 A1 | 1/2006 | Hongal et al. | |
| 2007/0127479 A1 * | 6/2007 | Sinicrope et al. | 370/392 |
| 2007/0280267 A1 | 12/2007 | Ould-Brahim | |
| 2007/0286090 A1 * | 12/2007 | Rusmisel et al. | 370/252 |
| 2008/0151895 A1 | 6/2008 | Krzanowski | |
| 2008/0253367 A1 * | 10/2008 | Ould-Brahim | 370/389 |
| 2008/0279110 A1 * | 11/2008 | Hart et al. | 370/248 |
| 2009/0016458 A1 | 1/2009 | Asati et al. | |
| 2009/0086621 A1 | 4/2009 | Wan et al. | |
| 2009/0185573 A1 | 7/2009 | Guichard et al. | |
| 2009/0285089 A1 | 11/2009 | Srinivasan | |
| 2010/0023632 A1 | 1/2010 | Liu | |
| 2011/0090909 A1 | 4/2011 | Krzanowski | |
| 2013/0235875 A1 | 9/2013 | Mohan et al. | |
| 2013/0336324 A1 * | 12/2013 | Solomon | 370/392 |

OTHER PUBLICATIONS

Martini et al., "Pseudowire Setup and Maintenance Using the Label Distribution Protocol (LDP)" Network Working Group, Apr. 2006, rfc4447, 30 pages.

Martini et al., "Pseudowire Setup and Maintenance Using the Label Distribution Protocol (LDP)" Network Working Group, Apr. 2006, 34 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|0| PW Bi-dir.LSP Tunnel TLV |              Length            |
|   |      (0x096D)            |                                |
+-+-+-+-+-+-+-+-+-+-+-+-+-+-+-+-+-+-+-+-+-+-+-+-+-+-+-+-+-+-+-+-+
|  Sub-TLV Type   |   Length    |     Variable Length Value     |
+-+-+-+-+-+-+-+-+-+-+-+-+-+-+-+-+-+-+-+-+-+-+-+-+-+-+-+-+-+-+-+-+
|                      Variable Length Value                    |
|                              "                                |
+-+-+-+-+-+-+-+-+-+-+-+-+-+-+-+-+-+-+-+-+-+-+-+-+-+-+-+-+-+-+-+-+
```

FIG. 3

| Sub-TLV Type | Length | Value |
|---|---|---|
| 0x01 | 6/18 | Destination IPv4 or IPv6 address of a tunnel |
| 0x02 | 2 | Tunnel identifier |
| 0x03 | 6/18 | Extended tunnel identifier |
| 0x04 | 6/18 | Source IPv4 or IPv6 address of a tunnel |
| 0x05 | 2 | LSP identifier |

FIG. 4

ID FEC TLV (0x80).
METHOD, DEVICE AND SYSTEM FOR ESTABLISHING PSEUDO WIRE

CROSS-REFERENCE TO RELATED APPLICATIONS

This application is a continuation of U.S. patent application Ser. No. 12/982,571, filed on Dec. 30, 2010, which is a continuation of International Application No. PCT/CN2009/071904, filed on May 21, 2009. The International Application claims priority to Chinese Patent Application No. 200810141666.3, filed on Jul. 17, 2008 and Chinese Patent Application No. 200810214839.X, filed on Aug. 29, 2008. The afore-mentioned patent applications are hereby incorporated by reference in their entireties.

FIELD OF THE INVENTION

The present invention relates to the communication field, and in particular, to a method, a device and a system for establishing a pseudo wire (PW).

BACKGROUND OF THE INVENTION

A PW is a technology of simulating various point-to-point services on a packet switching network. Currently, a PW is established by adopting the label distribution protocol (LDP), and the PW needs to be carried on a label switching path (LSP) tunnel. Establishment of the LSP tunnel is independent of the establishment of the PW.

The following takes a process of establishing an LDP PW as an example. As shown in FIG. 1, provider edge 1 (PE1) and PE2 send a PW label request to each other to establish an LDP peer. To establish a PW from PE2 to PE1, PE1 sends a PW label mapping message a (LMa) to PE2. A forwarding equivalence class type length value (FEC TLV) carried in the message LMa may be a general PW ID FEC TLV (0x81) or a PW ID FEC TLV (0x80).

If the general PW ID FEC TLV is used, the message LMa carries at least an attachment group identifier (AGI), a source attachment individual identifier (SAID, and a target attachment individual identifier (TAII). In addition, the message LMa may further carry addresses of PE1 and PE2, interface parameters, a group ID, a transmission direct circuit, and a PE capability.

If the PW ID FEC TLV is used, the message LMa carries at least a PW ID. In addition, the message LMa may further carry addresses of PE1 and PE2, a transmission direct circuit, and a PE capability.

After receiving the message LMa, PE2 matches a corresponding local PW according to the AGI, SAII, TAII, or PW ID carried in the message LMa. In addition, PE2 takes the corresponding PW as a PW label at the PW multiplexing layer. In this case, a PW from PE2 to PE1 is established.

When PE2 does not successfully match a corresponding PW, PE2 sends a corresponding label release message to PE1 carrying a state code "Unassigned/Unrecognized TAI", and the process ends.

After the PW from PE2 to PE1 is successfully established, if PE2 does not send a PW label mapping message b (LMb) to PE1 before receiving the message LMa, a PW from PE1 to PE2 needs to be established. The process of establishing a PW from PE1 to PE2 is similar to the preceding process of establishing a PW from PE2 to PE1.

If PE2 has sent a message LMb to PE1 before receiving the message LMa, a PW from PE1 to PE2 does not need to be established, and the process ends.

Therefore, during research, the inventor finds at least the following drawbacks in the prior art: There is no association between LSP tunnel selections performed by two PEs; therefore, a PW service with the high quality cannot be assured. For example, if the PW service is required to provide QoS assurance at a same level in two directions, the two PEs need to automatically select LSP tunnels with QoS assurance at a same level. The prior art cannot fulfill the process. For another example, if an MPLS TP PW service may be required to carry a PW on a bidirectional LSP tunnel. The PEs at two ends can independently select a bidirectional LSP tunnel. As a result, the two selected LSPs are different, and the preceding requirements cannot be met.

SUMMARY OF THE INVENTION

Embodiments of the present invention provide a method, a device and a system for establishing a PW, so as to establish associated PWs on LSP tunnels.

A method for establishing a PW includes:
receiving a first LM message, where the first LM message carries a PW ID, PW parameters, and LSP tunnel information that are selected by the sender of the first LM message; matching a local PW according to the PW ID; performing parameter negotiation of the local PW according to the PW parameters; matching a local tunnel according to the LSP tunnel information; and
binding the local tunnel and the local PW when the matching between the PW ID and the LSP tunnel information is successful; and establishing a PW when the parameter negotiation is successful.

A device for establishing a PW includes:
a receiving unit 1, configured to receive a first LM message, where the first LM message carries a PW ID, PW parameters, and LSP tunnel information that are selected by the sender of the first LM message;
a PW matching unit 2, configured to match a local PW according to the PW ID;
a parameter negotiating unit 3, configured to perform parameter negotiation of the local PW according to the PW parameters;
a tunnel matching unit 4, configured to match a local tunnel according to the LSP tunnel information;
a binding unit 5, configured to bind the local tunnel and the local PW when the matching between the PW ID and the LSP tunnel information is successful; and
a PW establishing unit 6, configured to establish a PW when the parameter negotiation is successful and the binding unit 5 successfully performs the binding.

A system for establishing a PW includes:
a first node, configured to send a first LM message, where the first LM message includes a PW ID, PW parameters, and LSP tunnel information that are selected by the first node; and
a second node, configured to receive the first LM message; match a local PW according to the PW ID; perform parameter negotiation of the local PW according to the PW parameters; match a local tunnel according to the LSP tunnel information; and bind the local tunnel and the local PW when the matching between the PW ID and the LSP tunnel information is successful.

With the method, device and system for establishing a PW according to embodiments of the present invention, LSP tunnel information is carried so that an association between LSP tunnel selections performed by two parties is produced when the two parties establish a PW, thus enhancing the reliability of the information transmission process; and bidirectional LSP tunnel information is carried to enable the two parties to establish PWs on a same bidirectional LSP tunnel.

BRIEF DESCRIPTION OF THE DRAWINGS

FIG. 3 is a schematic view showing the format of a TLV of a bidirectional LSP tunnel according to an embodiment of the present invention;

FIG. 4 is a schematic view showing the type of a sub-TLV of a bidirectional LSP tunnel according to an embodiment of the present invention;

DETAILED DESCRIPTION OF THE EMBODIMENTS

The technical solution of the present invention and its benefits are hereinafter described in detail with reference to some exemplary embodiments and the accompanying drawings.

Figure 1:
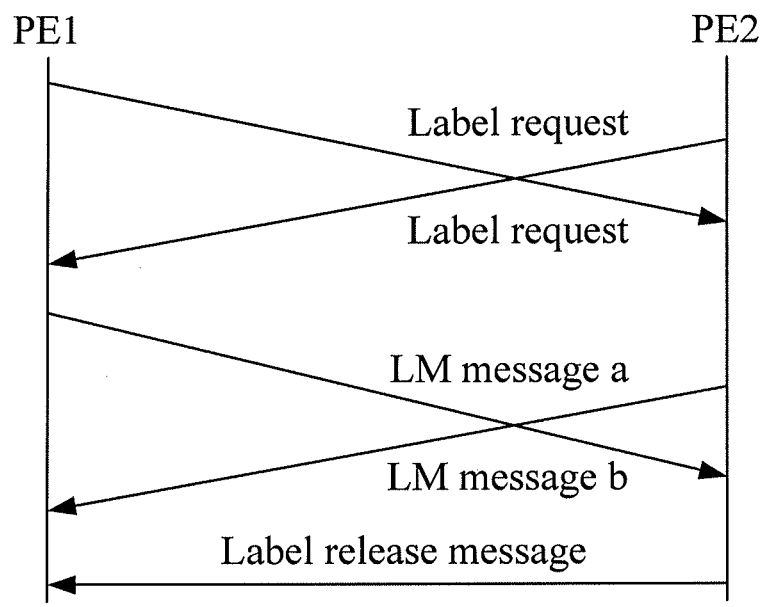
FIG. 1 is a schematic view showing a process of establishing a PW by adopting the LDP in a prior art.
Figure 2:
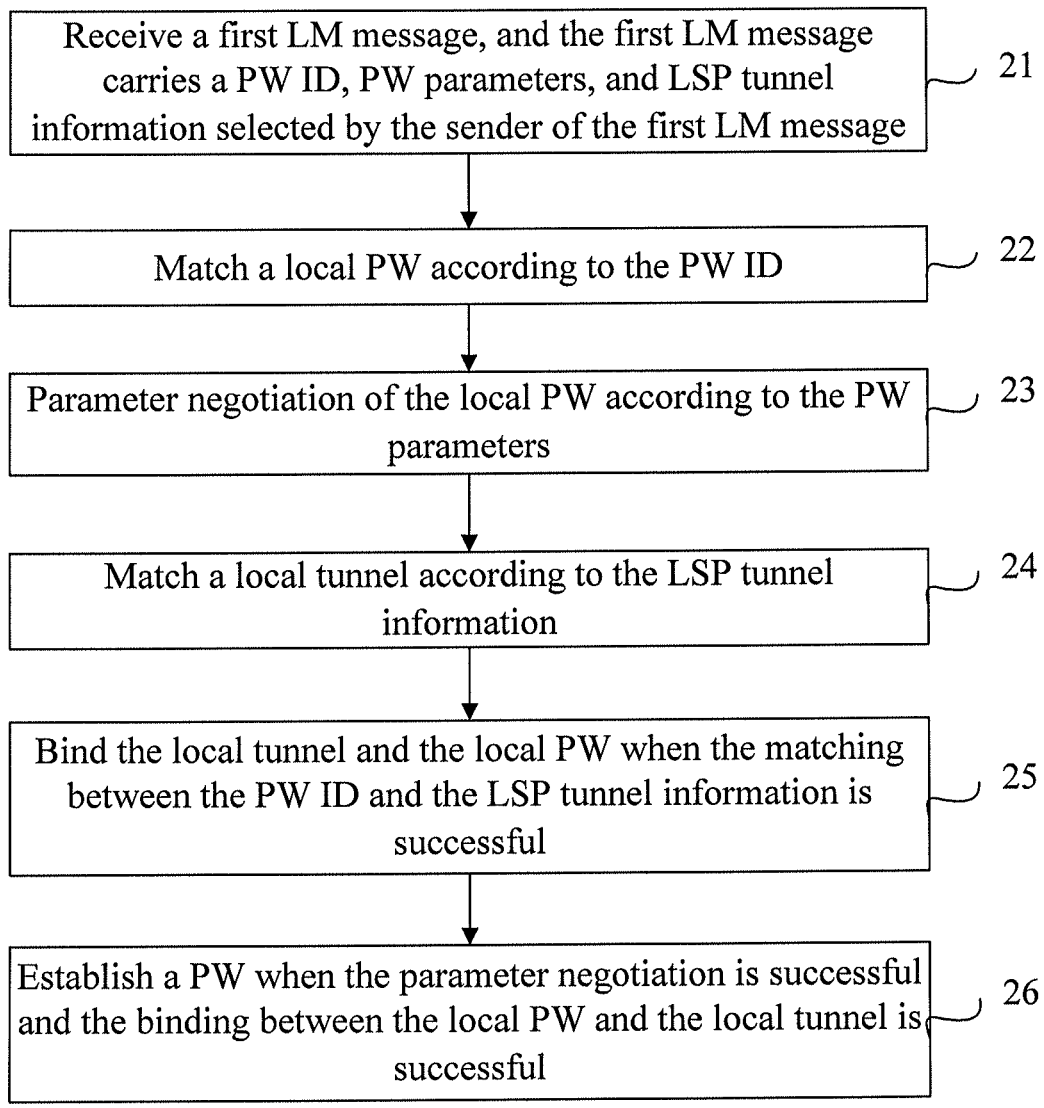
FIG. 2 is a schematic view showing a flowchart of a method for establishing a PW according to an embodiment of the present invention.

As shown in FIG. 2, a method for establishing a PW according to an embodiment of the present invention includes:

Step 21: Receive a first LM message, where the first LM message carries a PW ID, PW parameters, and LSP tunnel information that are selected by the sender of the first LM message.

During specific implementation of the embodiment of the present invention, the LSP tunnel information includes an LSP tunnel ID and tunnel information. An LSP tunnel in the LSP tunnel information is a unidirectional or bidirectional LSP tunnel, and accordingly, the local tunnel is the unidirectional or bidirectional tunnel.

Step 22: Match a local PW according to the PW ID.

Step 23: Perform parameter negotiation of the local PW according to the PW parameters.

Step 24: Match a local tunnel according to the LSP tunnel information.

Step 25: Bind the local tunnel and the local PW when the matching between the PW ID and the LSP tunnel information is successful.

When the matching between the PW ID and the LSP tunnel information fails, send a first label release message to the sender of the first LM message, where the first label release message carries an LDP state code "Unassigned/Unrecognized Bidirectional LSP Tunnel".

It should be noted that, step 23 may be performed after step 24 and before step 25, and may also be performed after step 24 and step 25.

Step 26: Establish a PW when the parameter negotiation is successful and when the binding of the local PW and the local tunnel is successful.

Release the binding of the local PW and the local tunnel when the parameter negotiation fails.

After a PW is established, send a second LM message to the sender of the first LM message, where the second LM message carries information about the local PW and information about the local tunnel.

The following description takes the establishment of a bidirectional PW from PE2 to PE1 as an example. PE1 is an egress node, and PE2 is an ingress node.

100A: PE1 selects a PW for establishing a PW from PE2 to PE1.

200A: PE1 selects a bidirectional LSP tunnel for the PW.

300A: PE1 sends a label mapping message c (LMc) to PE2, and the message LMc carries the PW ID, PW parameters, and bidirectional LSP tunnel information.

There may be multiple implementation modes for the message LMc to carry the PW ID. The implementation mode is not limited in embodiments of the present invention. For example, PW information may be carried in an FEC TLV of the message LMc, and the PW information may be a general PW ID FEC TLV (0x81) or a PW ID FEC TLV (0x80).

There may be multiple implementation modes for the message LMc to carry the bidirectional LSP tunnel information. The implementation mode is not limited in embodiments of the present invention. Generally, the bidirectional LSP tunnel information may be represented by a bidirectional LSP tunnel ID and tunnel information.

The bidirectional LSP tunnel ID is used to identify a bidirectional LSP tunnel. If the bidirectional LSP tunnel ID is carried, it indicates that a PW established between PE1 and PE2 is based on a same LSP tunnel.

To identify a globally unique tunnel, the tunnel information contains at least a doublet formed by a tunnel ID and an LSP ID. In addition, the tunnel information may further contain a quaternary formed by a tunnel ID, an LSP ID, a tunnel end point address, and a tunnel sender address, or contain a quintuplet formed by a tunnel ID, an LSP ID, a tunnel end point address, a tunnel sender address, and an extended tunnel ID.

During specific implementation of the embodiment of the present invention, the bidirectional LSP tunnel information may be carried by a PW FEC TLV in the message LMc. For example, the bidirectional LSP tunnel information may be carried by a TLV of a bidirectional LSP tunnel in the PW FEC TLV, as shown in FIG. 3. This format is not limited. FIG. 3 is a schematic view showing the format of a TLV of a bidirectional LSP tunnel. The TLV of a bidirectional LSP tunnel includes a common TLV header unit and a variable length value unit. The "Type" field conforms to the coding definition of the Internet Assigned Numbers Authority (IANA) for an LDP TLV. The value is not conflicted with an existing legal value.

As mentioned above, the bidirectional LSP tunnel information may be represented by a bidirectional LSP tunnel ID and tunnel information. The bidirectional LSP tunnel ID is carried by the "Bidirectional LSP Tunnel TLV" field. The tunnel information exists in the "Value" field of a TLV of a bidirectional LSP tunnel and is carried by a sub-TLV of the TLV of a bidirectional LSP tunnel. As shown in FIG. 4, in consideration of alignment of four bytes of the LSP tunnel TLV format, two bytes "00" are added in front of the start position of an IPV4 or IPV6 address with four or six bytes.

PE1 encapsulates at least a bidirectional LSP tunnel ID and tunnel information into a TLV of a bidirectional LSP tunnel. Then, PE1 encapsulates information about the TLV of a bidirectional LSP tunnel, the PW, the PW parameters, and optional addresses of PE1 and PE2 into a PW FEC TLV, namely, a PW ID FEC TLV or a general PW ID FEC TLV.

The specific encapsulation mode of the TLV of a bidirectional LSP tunnel and its position in the PW FEC TLV are not limited.

400A: PE2 receives the message LMc.

500A: PE2 matches a local PW and a local LSP tunnel according to the PW ID and the bidirectional LSP tunnel information carried in the message LMc. After the matching is successful, PE2 binds the PW ID and the bidirectional LSP tunnel information carried in the message LMc.

After PE2 successfully performs parameter negotiation of the local PW according to the PW parameters carried in the message LMc, and after the PW ID is bound to the bidirectional LSP tunnel information, PE2 establish a PW.

600A: PE2 sends a label mapping message d (LMd) to PE1. The message LMd carries the PW ID and bidirectional LSP tunnel information. The encapsulation format of the message LMd is the same as the encapsulation format of the message LMc described in step 300A. That is, PE1 encapsulates the tunnel information and the bidirectional LSP tunnel ID into the TLV of the bidirectional LSP tunnel, and then encapsulates them into a PW FEC TLV and the message LMd.

700: After PE1 receives the message LMd, it indicates that a PW carried on a bidirectional LSP tunnel is established if the bidirectional LSP tunnel ID carried in the message LMd is the same as the bidirectional LSP tunnel information carried in the message LMc. The process of establishing the PW ends.

Figure 5:
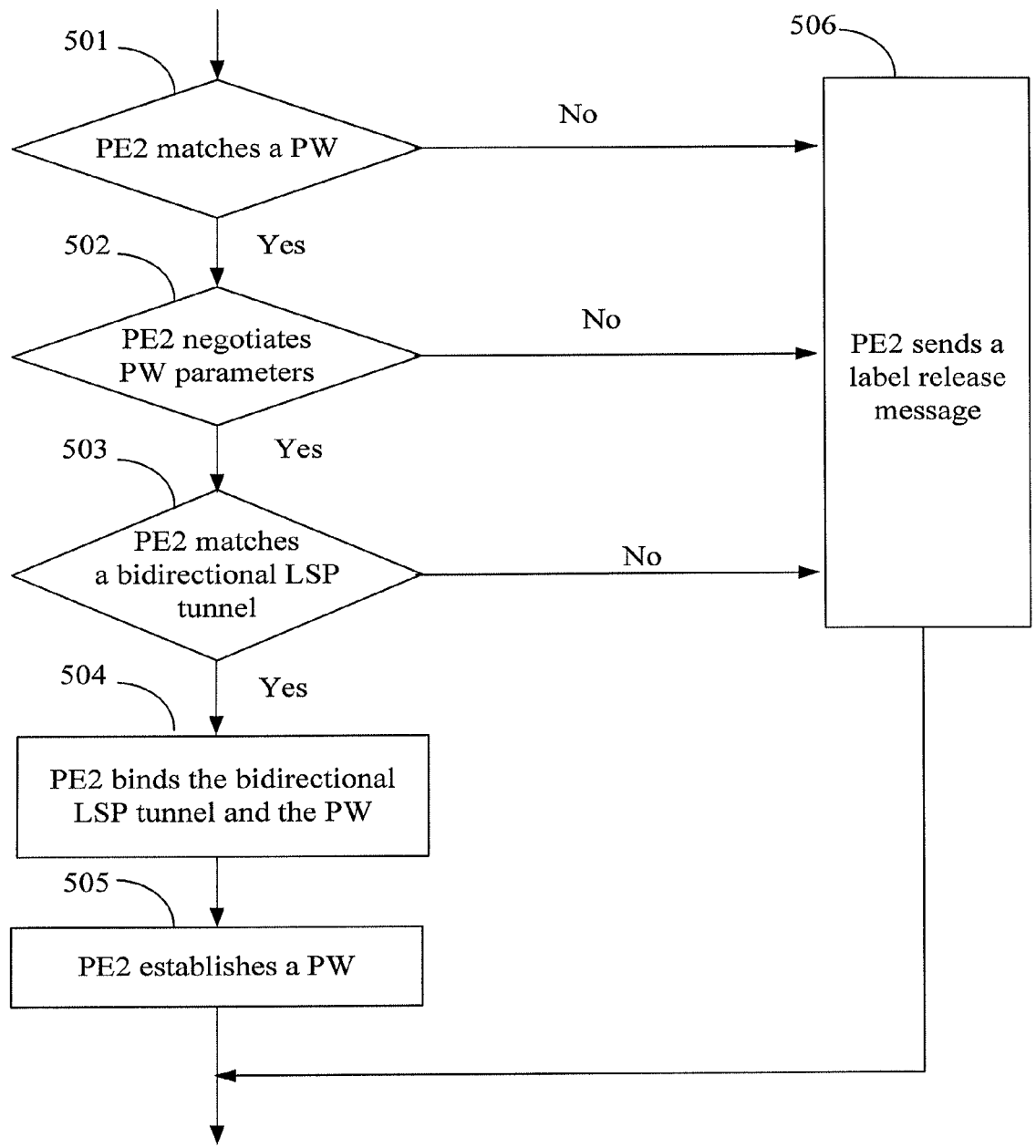
FIG. 5 is a schematic view showing a flowchart of a first method for establishing a PW according to an embodiment of the present invention.

In step 500A, according to the different modes of sending an LM message by PE1 and PE2, the operation is further divided into two occasions:

(1) When PE2 passively matches and binds a local PW and a local LSP tunnel according to the message LMc, the specific process is as shown in FIG. 5 and includes:

501: According to the PW ID carried in the message LMc, PE2 matches a local PW. For example, according to the AGI, SAII, and TAII information or the PW ID information carried in the message LMc, PE2 matches a local PW. If no corresponding local PW is matched, PE2 generates a first label release message, where the first label release message carries an LDP state code "Unassigned/Unrecognized TAI". The process proceeds to step 506.

502: According to the PW parameters carried in the message LMc, such as PW attribute parameters and PW interface parameters, PE2 performs PW parameter negotiation. That is, PE2 performs parameter negotiation of the local PW according to PE1 parameters carried in the message LMc. If the parameter negotiation fails, PE2 generates a second label release message. According to the corresponding negotiation result, PE2 sets a corresponding LDP state code in the second label release message. The process proceeds to 506.

503: PE2 matches a local bidirectional LSP tunnel according to the bidirectional LSP tunnel information carried in the message LMc.

When no corresponding local bidirectional LSP tunnel is matched, PE2 generates a third label release message. The third label release message carries an LDP state code "Unassigned/Unrecognized Bidirectional LSP Tunnel". The process proceeds to step 506.

The preceding "Unassigned/Unrecognized Bidirectional LSP Tunnel" is a new type of an LDP state code added according to embodiments of the present invention. The new type conforms to the definition of the IANA for an LDP state code. The value is not conflicted with an existing legal value.

504: PE2 binds the PW successfully matched in step 501 and the bidirectional LSP tunnel successfully matched in step 503.

505: PE2 takes PW the successfully matched in step 501 as a PW label at the PW multiplexing layer. By then, a PW from PE2 to PE1 is established.

506: PE2 sends the first label release message, the second label release message, or the third label release message to PE1. By then, a PW from PE2 to PE1 is not successfully established.

Figure 6:
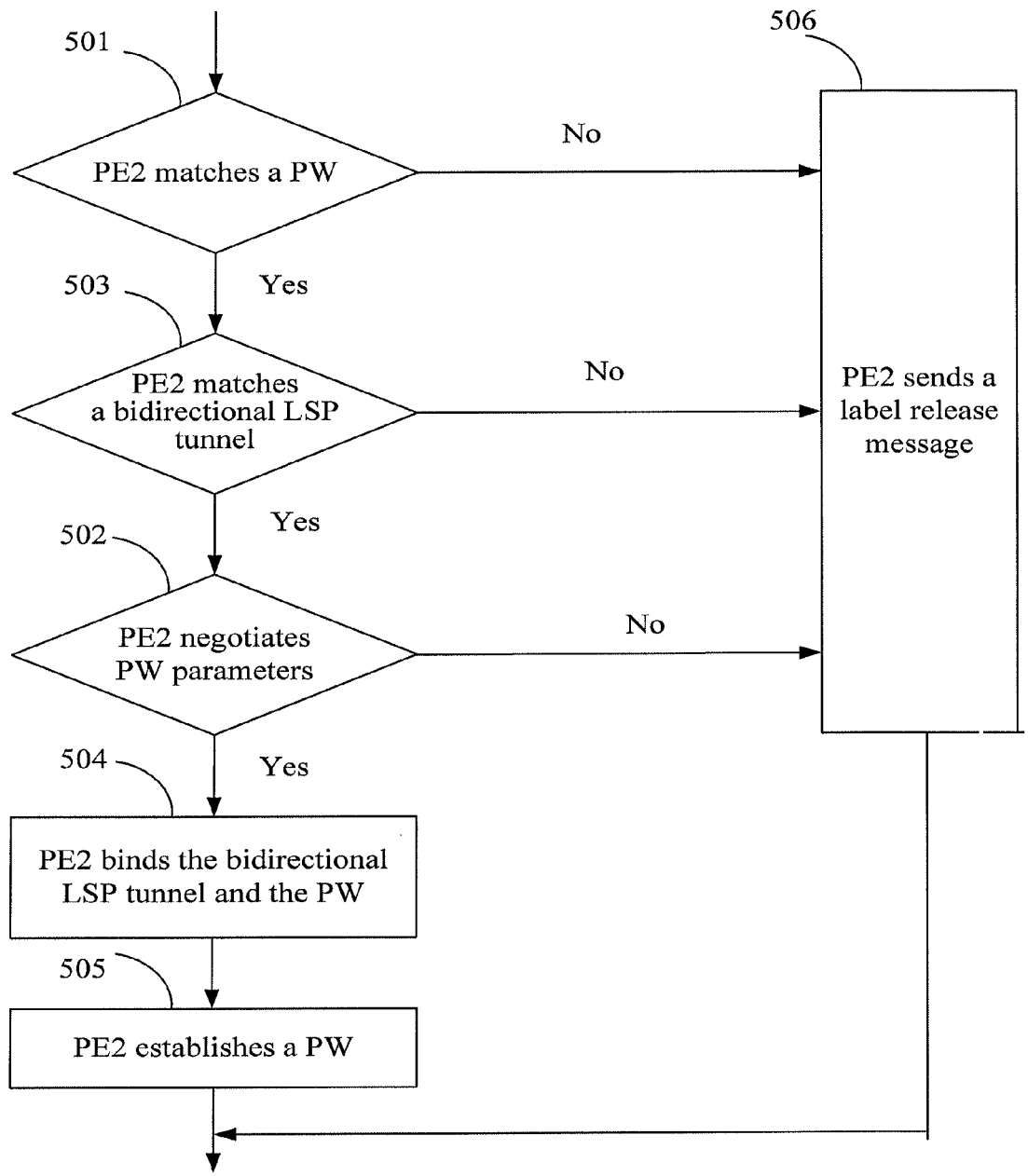
FIG. 6 is a schematic view showing a flowchart of a second method for establishing a PW according to an embodiment of the present invention.
Figure 7:
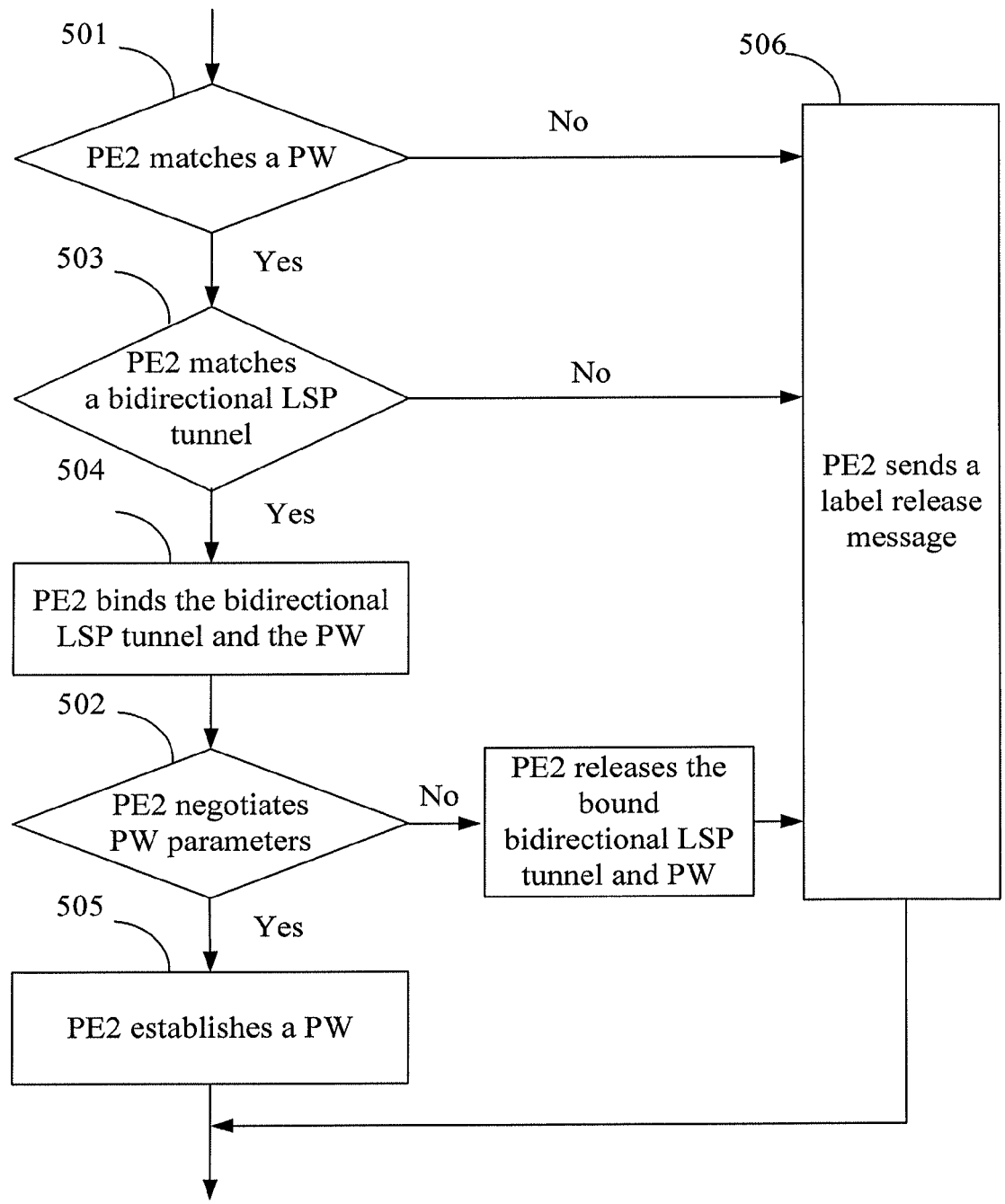
FIG. 7 is a schematic view showing a flowchart of a third method for establishing a PW according to an embodiment of the present invention.

In the specific implementation process, the sequence of step 502 may be exchanged with that of step 503, as shown in FIG. 6; step 502 may also be performed after step 504; that is, the parameter negotiation may be performed after the bidirectional LSP tunnel is bound to the PW. If the parameter negotiation fails, before an LDP state code is set, the bound bidirectional LSP tunnel and PW needs to be released, as shown in FIG. 7.

(2) PE1 may negotiate with PE2 to determine a bidirectional LSP tunnel by using one of the following two methods:

a. If PE2 has sent a label mapping message c' (LMc') to PE1 before receiving the message LMc, PE2 compares the bidirectional LSP tunnel information carried in the message LMc with a locally bound bidirectional LSP tunnel information that is carried in the message LMc'. If they are consistent, it indicates that a PW carried on a bidirectional LSP tunnel is established. The process proceeds to step 700. If they are inconsistent, PE2 compares node IDs (such as IP addresses) of PE1 and PE2 to determine the selected bidirectional LSP tunnel. The process proceeds to step 500A.

For example, when the node with a larger IP address is an egress node, during specific implementation of the embodiment of the present invention, PE2 finds that the bidirectional LSP tunnel information of PE1 is inconsistent with the locally bound bidirectional LSP tunnel information that is carried in the message LMc' after receiving the message LMc. PE2 compares a local IP address with an IP address of PEI. If the IP address of PE1 is larger than the local IP address, PE2 changes the locally bound bidirectional LSP tunnel as the bidirectional LSP tunnel selected by PE1. PE2 resends a label mapping message e (LMe) carrying the newly selected bidirectional LSP tunnel information to PE1, and the message LMe carries the bidirectional LSP tunnel information selected by PE1. The PW establishment process ends. If the IP address of PE1 is smaller than the IP address of PE2, PE2 does not change the locally bound bidirectional LSP tunnel information. After receiving the message LMc' sent by PE2, PE1 changes the bidirectional LSP tunnel selected by PE2 as the bidirectional LSP tunnel selected by PE1.

b. Before PE1 and PE2 send an LM message to the peer, it is specified that PE1 or PE2 selects a bidirectional LSP tunnel. For example, a node or a node with a larger or smaller node ID sends an LM message forcibly. In the embodiment, it is specified that PE1 with a larger node ID sends an LM message. PE2 must determine whether it sends an LM message after receiving the LM message sent by PE1. After PE2 receives the message LMc sent by PE1, the process proceeds to step 500.

The following description takes establishment of a unidirectional PW from PE2 to PE1 as an example. PE1 is an egress node, and PE2 is an ingress node.

100B: PE1 selects a PW for establishing a PW from PE2 to PE1.

200B: PE1 selects a unidirectional LSPa tunnel from PE1 to PE2 for the PW selected in step 100. PE1 recommends a reverse LSPb tunnel from PE2 to PE1 that carries PWs, for PE2.

PE1 is capable of selecting LSP tunnels in two directions. For example, a customer edge (CE) raises a requirement for PE1: A PW service has the same multi-protocol label switching traffic engineering (MPLS-TE) capability assurance in two directions. In this case, PE1 is capable of selecting LSP tunnels in two directions. For another example, in consideration of load balance, PE1 hopes that the LSP tunnels in two directions should have different paths. Specifically, PE1 selects LSP1, from PE1 to PE2, that has the MPLS-TE capability. PE1 hopes that PE2 can select a reverse LSP that has the same MPLS-TE assurance. In this case, PE1 recommends reverse LSP2 that has the same MPLS-TE assurance as LSP1, for PE2. For still another example, in consideration of load balance, PE1 hopes to select an LSP4 tunnel that has a path different from an LSP3 tunnel. PE1 recommends LSP4 for PE2.

300B: PE1 sends a message LMc to PE2, and the message LMc carries the PW ID, PW parameters, and LSPb tunnel information.

There may be multiple implementation modes for the message LMc to carry the LSP tunnel information. The implementation mode is not limited in embodiments of the present invention. Generally, the LSP tunnel information may be represented by an LSP tunnel ID and tunnel information. The LSP tunnel ID is used to identify an LSP tunnel.

To identify a globally unique tunnel, the tunnel information contains at least a doublet formed by a tunnel ID and an LSP ID. In addition, the tunnel information may further contain a quaternary formed by a tunnel ID, an LSP ID, a tunnel end point address, and a tunnel sender address or contain a quintuplet formed by a tunnel ID, an LSP ID, a tunnel end point address, a tunnel sender address, and an extended tunnel ID.

Figure 8:
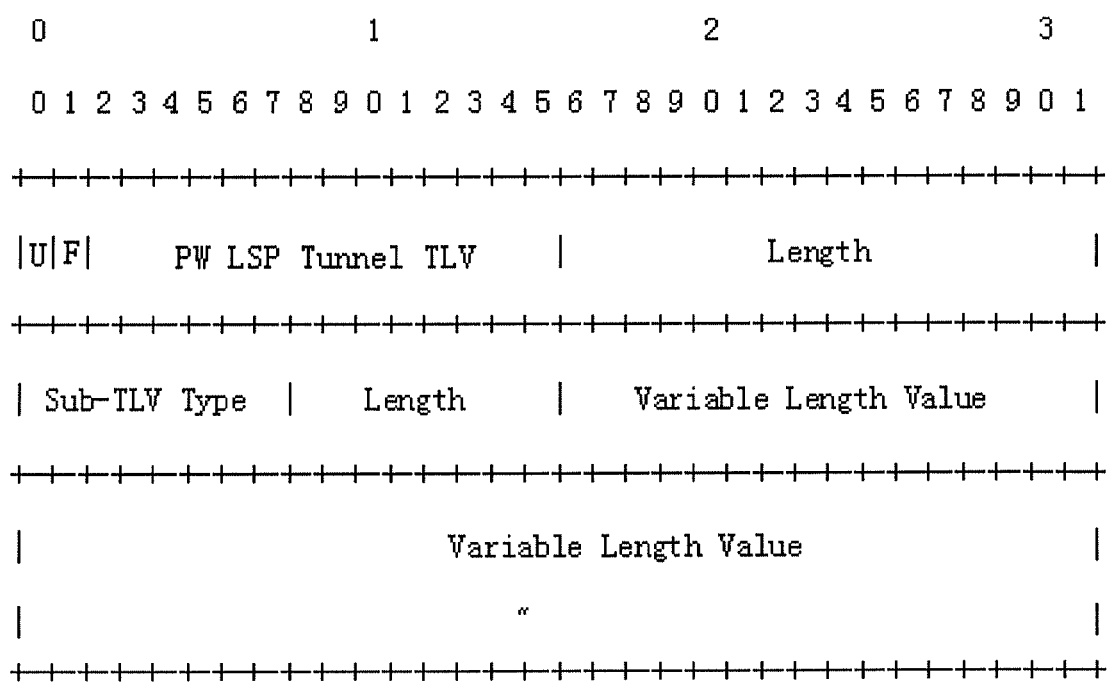
FIG. 8 is a schematic view showing the type of a TLV of a unidirectional LSP tunnel provided in an embodiment of the present invention.

During specific implementation of embodiments of the present invention, the LSP tunnel information may be carried through a PW FEC TLV in the message LMc. For example, the LSP tunnel information may be carried in a TLV of an LSP tunnel in a PW FEC TLV, as shown in FIG. 8. The TLV of an LSP tunnel includes a common TLV header unit and a variable length value unit. The "Type" field conforms to the coding definition of the IANA for an LDP TLV. The value is not conflicted with an existing legal value. The LSP tunnel ID is carried by the "PW LSP Tunnel TLV" field. The tunnel information exists in the "Value" field of a TLV of an LSP tunnel and is carried by a sub-TLV of the TLV of an LSP tunnel. In consideration of alignment of four bytes of the LSP tunnel TLV format, two bytes "00" are added in front of the start position of an IPV4 or IPV6 address with four or six bytes.

PE1 encapsulates at least an LSP tunnel ID and tunnel information into a TLV of an LSP tunnel. Then, PE1 encapsulates the TLV of an LSP tunnel, the PW, the PW parameters, and optional addresses of PE1 and PE2 into a PW FEC TLV, namely, a PW ID FEC TLV or a general PW ID FEC TLV.

The specific encapsulation mode of the TLV of an LSP tunnel and its position in the PW FEC TLV are not limited.

400B: PE2 receives the message LMc.

500B: PE2 matches a local PW and a local LSP tunnel according to the PW ID and the LSP tunnel information carried in the message LMc. After the matching is successful, PE2 binds the PW ID carried in the message LMc and the LSP tunnel information from PE2 to PE1.

After PE2 successfully performs parameter negotiation of the local PW according to the PW parameters carried in the message LMc, and the PW is bound to the LSP tunnel, a PW from PE2 to PE1 is established.

600B: PE2 sends a message LMd to PE1, and the message LMd may carry tunnel information of LSPa' from PE1 to PE2 that is recommended by PE2. PE2 encapsulates tunnel information of the recommended LSPa' and the LSP tunnel ID into a TLV of an LSP tunnel and then encapsulates them into a PW FEC and a message LMd respectively in sequence.

More specifically, when PE2 does not have the capability to recommend an LSP tunnel from PE2 to PE1, the sent message LMd does not carry LSP tunnel information; or PE2 determines using the tunnel information selected by PE1 through negotiation, the message LMd may not carry LSPa'.

Figure 9:
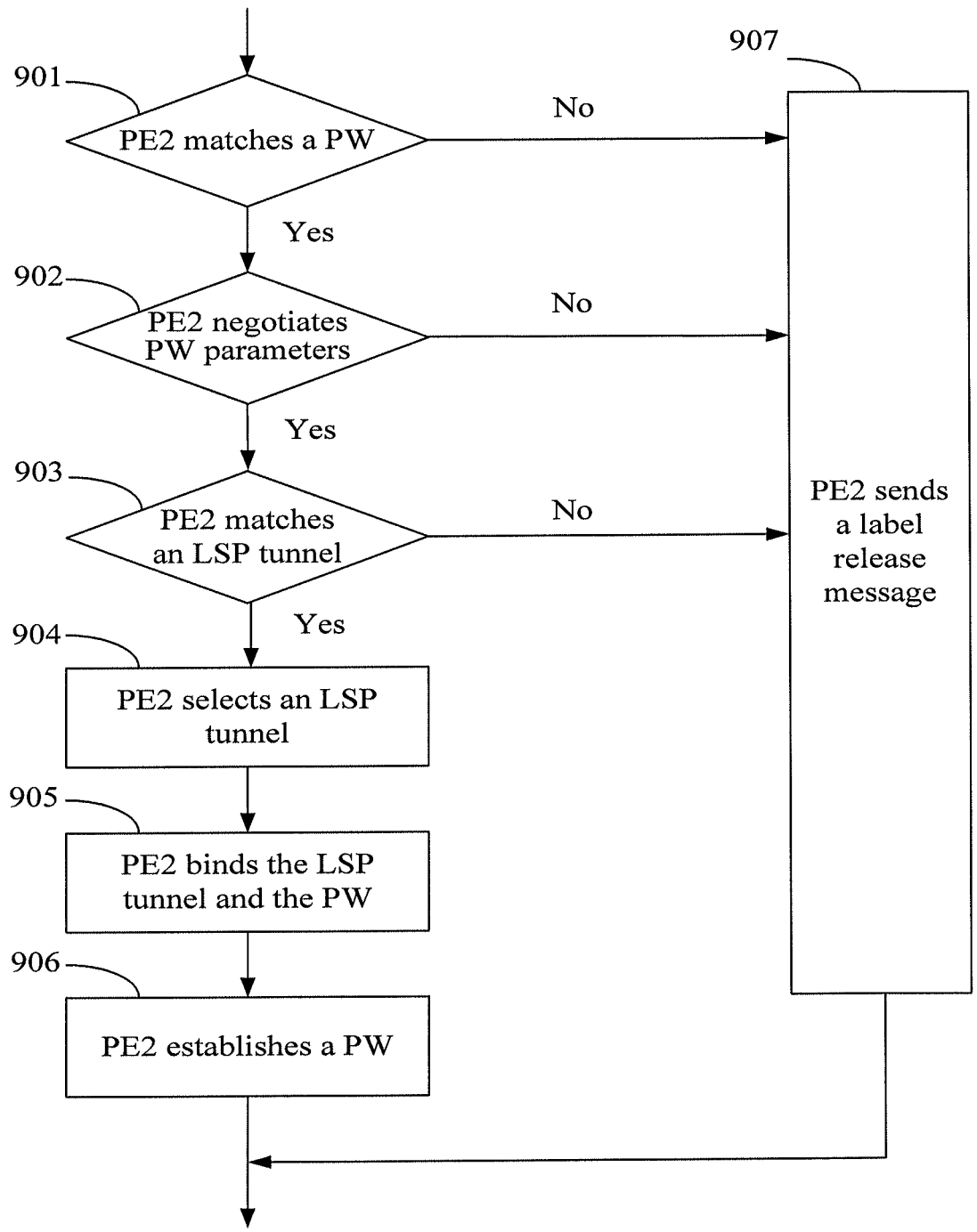
FIG. 9 is a schematic view showing a flowchart of a first method for establishing a PW according to an embodiment of the present invention.

The preceding 500B, as shown in FIG. 9, is further divided into the following steps:

901: According to the PW ID carried in the message LMc, PE2 matches a local PW. For example, according to the AGI, SAII, and TAII information or the PW ID information carried in the message LMc, PE2 matches a local PW. If no corresponding local PW is matched, PE2 generates a first label release message, where the first label release message carries an LDP state code "Unassigned/Unrecognized TAI". The process proceeds to step 907.

902: According to the PW parameters carried in the message LMc, such as PW attribute parameters and PW interface parameters, PE2 performs parameter negotiation. That is, PE2 performs parameter negotiation of the local PW according to the PE1 parameters carried in the message LMc. If the parameter negotiation fails, PE2 generates a second label release message. According to the corresponding negotiation result, PE2 sets a corresponding LDP state code in the second label release message. The process proceeds to 907.

903: PE2 matches a local LSP tunnel according to the LSPb tunnel, which is recommended by PE1 for PE2 and is carried in the message LMc.

When no corresponding local LSPb tunnel is matched, PE2 generates a third label release message. The third label release message carries an LDP state code "Unassigned/Unrecognized LSP Tunnel". The process proceeds to step 907.

The preceding "Unassigned/Unrecognized LSP Tunnel" is a new type of an LDP state code added according to embodiments of the present invention. The new type conforms to the definition of the IANA for an LDP state code. The value is not conflicted with an existing legal value.

904: PE2 selects an LSP tunnel.

According to the method for PE2 to select an LSP tunnel, the operation is divided into the following two occasions:

a. PE2 passively accepts that the LSP tunnel recommended by PE1 is selected as the used LSP tunnel. For example, the LSPb tunnel which is recommended by PE1 for PE2 and is carried in the message LMc sent to PE2 becomes the tunnel used by PE2.

b. PE2 negotiates with PE1 to determine the LSP tunnel used by PE2.

For example, according to the MPLS-TE capability required by a local CE or the load balance, PE2 selects a unidirectional LSPb' tunnel from PE2 to PE1, recommends a unidirectional LSPa' tunnel from PE1 to PE2 for PE1, but does not send a message LMd. PE1 and PE2 compare their node IDs to determine the node through which the selected LSP tunnel is valid. A node or a node with a larger or smaller node ID sends an LM message forcibly, and the peer selects the recommended LSP tunnel in the LM message.

If PE2 selects the LSPb' tunnel, PE2 needs to send an message LMd to PE1, and the message LMd carries the LSPa' tunnel recommended by PE2 for PE1. The LSP tunnel information of LSPa' can be represented by an LSP tunnel ID and tunnel information. The carrying mode and the encapsulation mode of the LSPa' tunnel information are described in step 300.

905: PE2 binds the PW successfully matched in step 901 and the unidirectional LSP tunnel from PE2 to PE1 selected in step 904.

906: PE2 takes the PW successfully matched in step 901 as a PW label at the PW multiplexing layer. By then, a PW from PE2 to PE1 is established.

907: PE2 sends the first label release message, the second label release message, or the third label release message to PE1. By then, a PW from PE2 to PE1 is not successfully established.

The process of establishing a PW from PE1 to PE2 is the same as the process of establishing a PW from PE2 to PE1, and is not described here.

Figure 10:
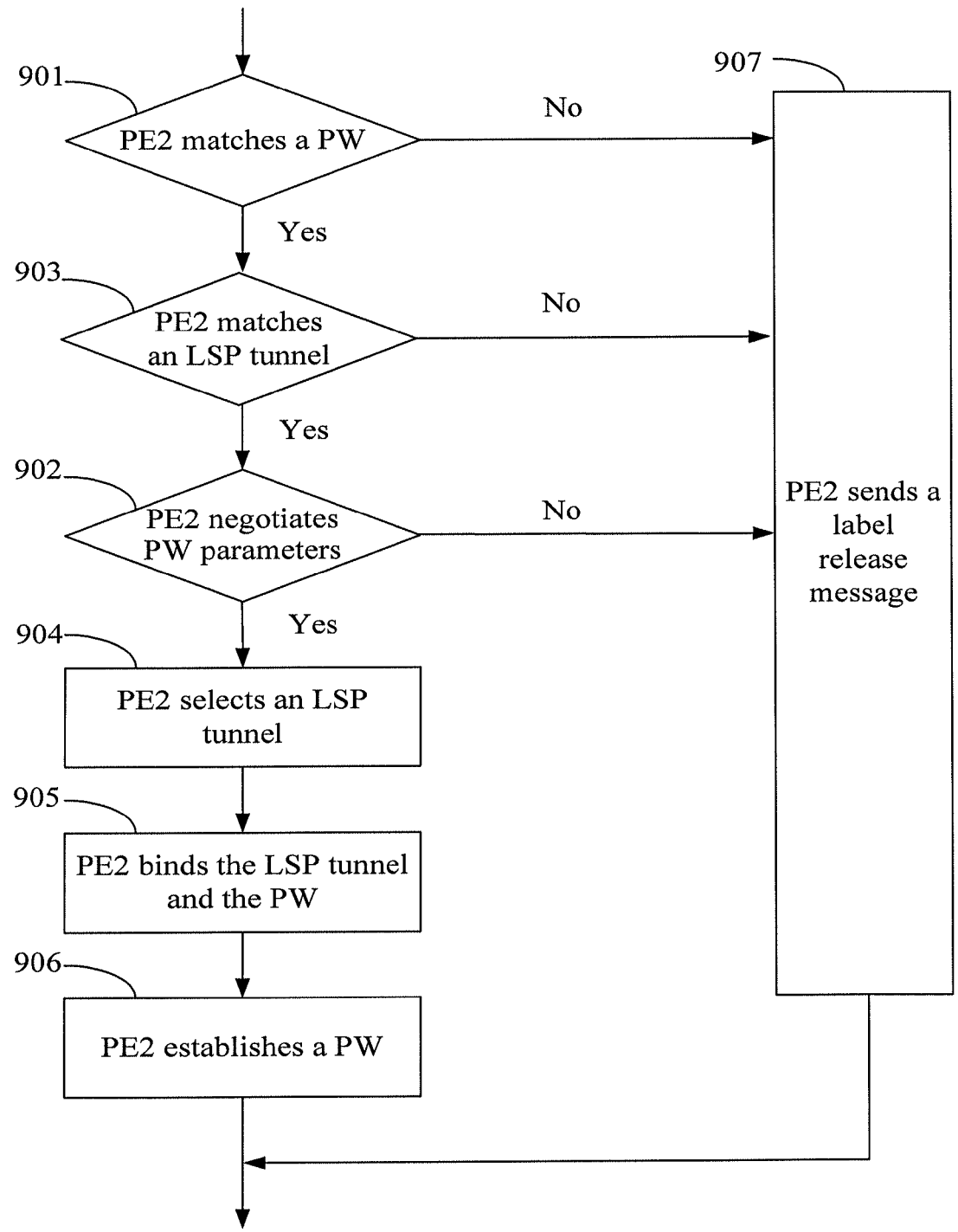
FIG. 10 is a schematic view showing a flowchart of a second method for establishing a PW according to an embodiment of the present invention.
Figure 11:
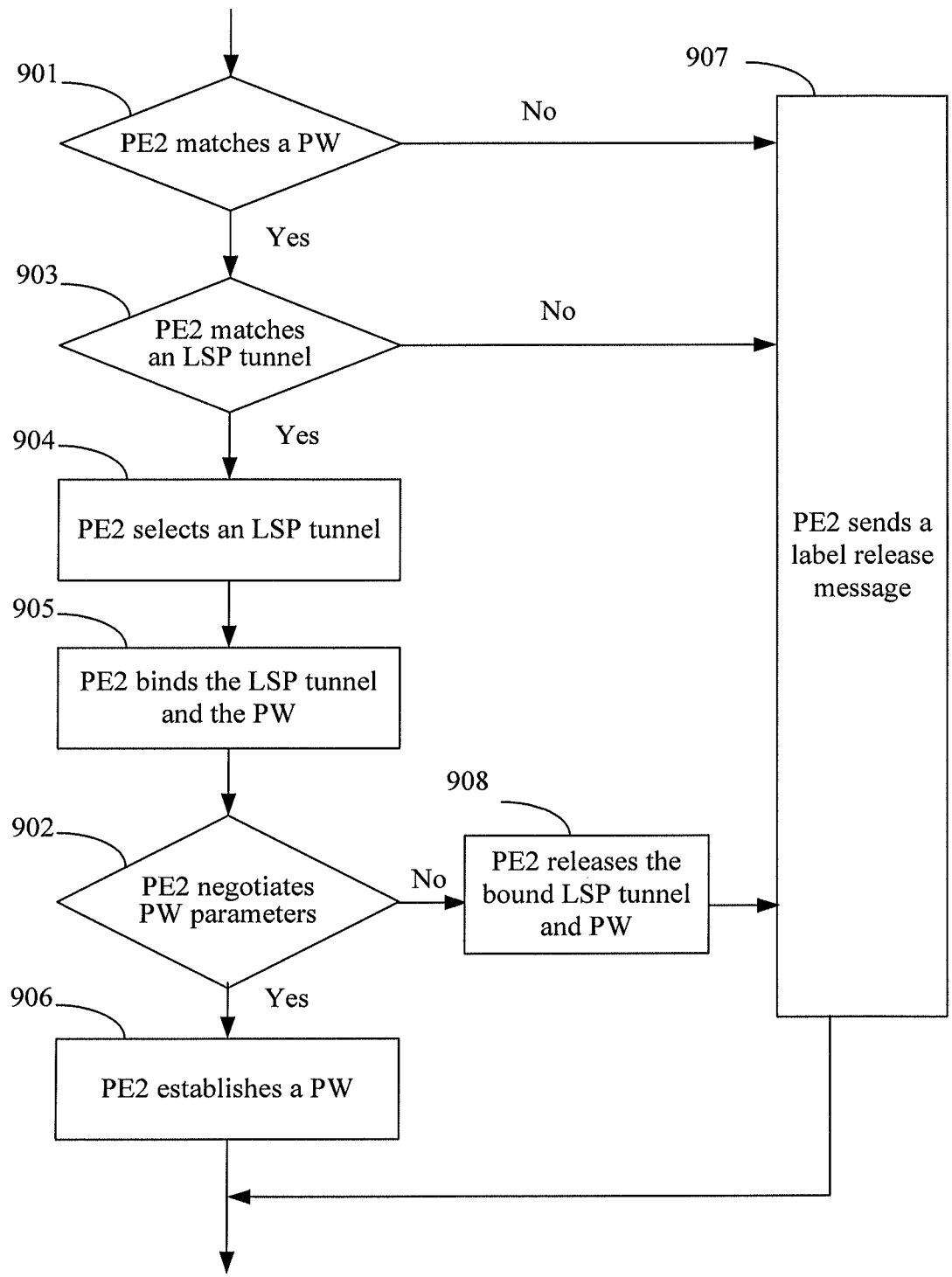
FIG. 11 is a schematic view showing a flowchart of a third method for establishing a PW according to an embodiment of the present invention.

In the specific implementation process, the sequence of step 902 may be exchanged with that of step 903, as shown in FIG. 10; step 902 may also be performed after step 905; that is, the parameter negotiation is performed after the LSP tunnel is bound to the PW. If the parameter negotiation fails, before an LDP state code is set, the bound LSP tunnel and PW needs to be released, as shown in FIG. 11.

Figure 12:
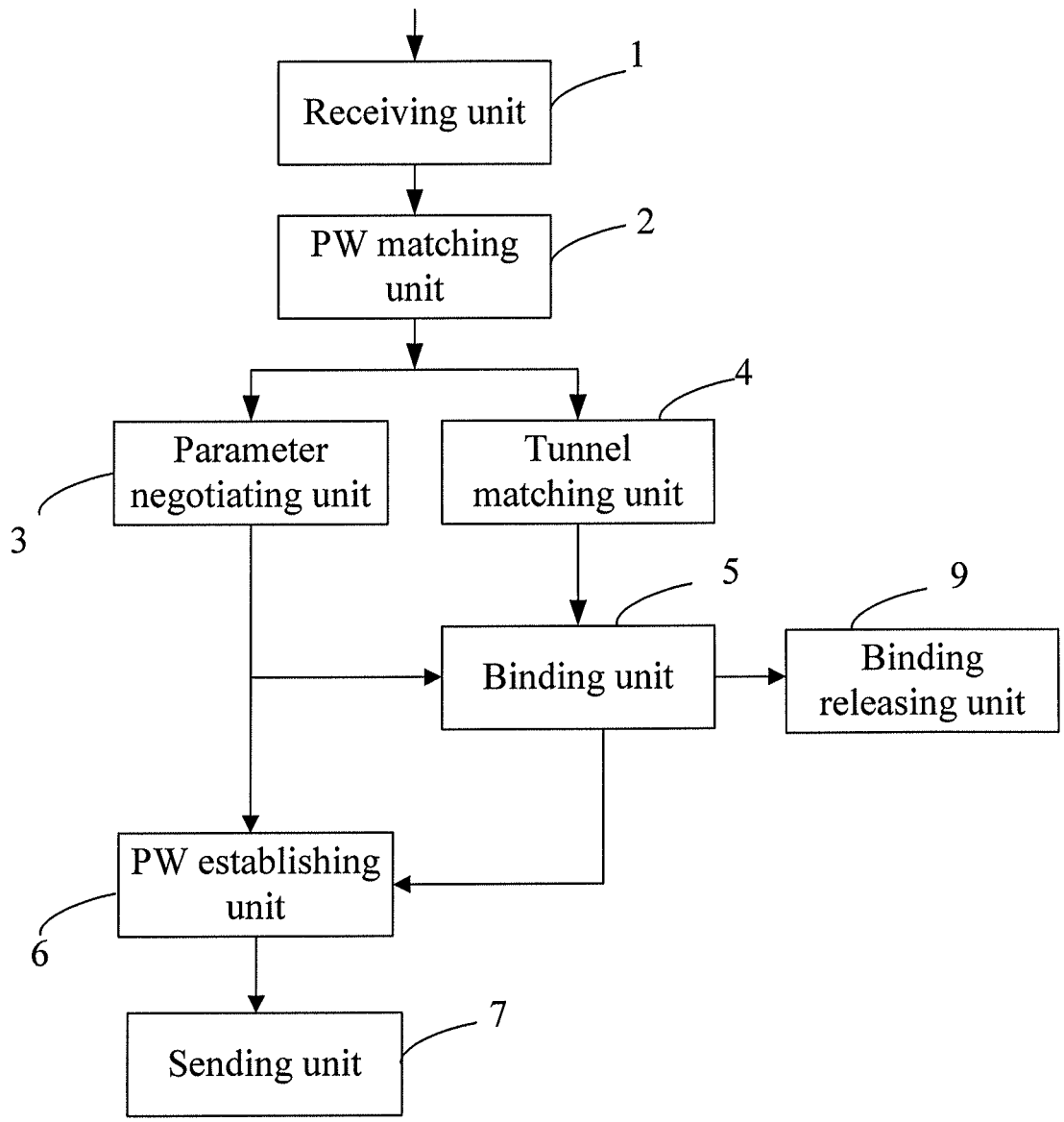
FIG. 12 is a schematic view showing a structure of a device for establishing a PW according to an embodiment of the present invention.

Embodiments of the present invention further provide a device for establishing a PW, where the device adopts the preceding method. As shown in FIG. 12, the device for establishing a PW includes a receiving unit 1, a PW matching unit 2, a parameter negotiating unit 3, a tunnel matching unit 4, a binding unit 5, and a PW establishing unit 6.

The receiving unit 1 is configured to receive a first LM message, where the first LM message carries a PW ID, PW parameters, and LSP tunnel information that are selected by the sender of the first LM message.

The PW matching unit 2 is configured to match a local PW according to the PW ID.

That is, according to the PW ID carried in the received message LMc, the PW matching unit 2 matches a local PW. For example, according to the AGI, SAII and TAII information or the VC ID information, the PW matching unit 2 matches a PW. If no corresponding local PW is matched, the PW matching unit 2 generates a first label release message, where the first label release message carries an LDP state code "Unassigned/Unrecognized TAI".

The parameter negotiating unit 3 is configured to perform parameter negotiation of the local PW according to the PW parameters.

That is, the parameter negotiating unit 3 is configured to perform parameter negotiation according to the PW parameters carried in the message LMc when the PW matching is successful. If the parameter negotiation fails, the parameter negotiating unit 3 generates a second label release message and sets a corresponding LDP state code in the second label release message according to the corresponding negotiation result.

The tunnel matching unit 4 is configured to match a local tunnel according to the LSP tunnel information.

That is, the tunnel matching unit 4 is configured to match a local LSP tunnel according to the LSP tunnel information carried in the message LMc when the PW matching is successful. When no corresponding local LSP tunnel is matched, the tunnel matching unit 4 generates a third label release message, where the third label release message carries an LDP state code "Unassigned/Unrecognized LSP Tunnel".

The binding unit 5 is configured to bind the local tunnel and the local PW when the matching between the PW ID and the LSP tunnel information is successful.

The local tunnel may be an LSP tunnel selected by the sender of the first LM message or an LSP tunnel determined according to a negotiation by the sender of the first LM message.

The PW establishing unit 6 is configured to take the successfully matched PW as a PW label at the PW multiplexing layer and establish a PW, when the negotiation of the PW parameters is successful and the binding unit 5 successfully performs the binding.

A device for establishing PW according to embodiments of the present invention further includes:

a sending unit 7, configured to send a second LM message to the sender of the first LM message after the PW establishing unit 6 establishes a PW, where the second LM message carries the PW information and the selected LSP tunnel information; and a binding releasing unit 9, configured to release the binding between the local tunnel and the local PW when the parameter negotiation fails.

It should be noted that, an LSP tunnel contained in the LSP tunnel information may be a unidirectional or bidirectional LSP tunnel; accordingly, the local tunnel matched by the tunnel matching unit 4 may be the unidirectional or bidirectional LSP tunnel.

A system for establishing a PW according to embodiments of the present invention includes:

a first node, configured to send a first LM message, where the first LM message includes a PW ID, PW parameters, and LSP tunnel information that are selected by the first node; and a second node, configured to receive the first LM message; match a local PW according to the PW ID; perform parameter negotiation according to the PW parameters; match a local tunnel according to the LSP tunnel information; and bind the local tunnel and the local PW when the matching between the PW ID and the LSP tunnel information is successful.

The local tunnel may be an LSP tunnel selected by the first node or an LSP tunnel determined according to a negotiation between the second node and the first node.

The second node is further configured to send a second LM message to the first node after a PW is established, where the second LM message carries information about the local PW and information about the local tunnel.

The second node is further configured to generate a first label release message when the PW ID does not match a corresponding local PW, where the first label release message carries an LDP state code "Unassigned/Unrecognized TAP"; generate a second label release message when the parameter negotiation fails, and set a corresponding LDP state code in the second label release message according to the parameter negotiation's result; generate a third label release message when the LSP tunnel information does not match a corresponding local LSP tunnel, where the third label release message carries an LDP state code "Unassigned/Unrecognized Bidirectional LSP Tunnel"; and send the first label release message, the second label release message, or the third label release message to the first node. By then, a PW from the second node to the first node is not successfully established.

The second node is further configured to perform parameter negotiation of the local PW according to the PW parameters; and release the binding between the local tunnel and the local PW when the parameter negotiation fails.

It should be noted that, an LSP tunnel in the LSP tunnel information may be a bidirectional LSP tunnel; accordingly, the local tunnel matched by the tunnel matching unit 4 may be the bidirectional LSP tunnel.

Therefore, with the method, device and system for establishing a PW establishment according to embodiments of the present invention, LSP tunnel information is carried so that an association between LSP tunnel selections performed by two parties is produced when the two parties establish a PW, thus enhancing the reliability of the information transmission process; and bidirectional LSP tunnel information is carried to enable the two parties to establish PWs on a same bidirectional LSP tunnel.

Persons of ordinary skills in the art may understand that all or part of the steps of the method according to the embodiments of the present invention may be implemented by a program instructing relevant hardware. The program may be stored in a computer readable storage medium. The storage medium may be a magnetic disk, a Compact Disk Read-Only Memory (CD-ROM), a Read-Only Memory (ROM) or a Random Access Memory (RAM).

It should be noted that, the above descriptions are merely some exemplary embodiments of the present invention, and those skilled in the art may make various improvements and refinements without departing from the spirit of the invention. All such modifications and refinements are intended to be covered by the present invention.

What is claimed is:

1. A method for establishing a pseudo wire, comprising:
    receiving, by a second provider edge device, a label mapping message from a first provider edge device, wherein the label mapping message carries label switching path (LSP) tunnel information of an LSP tunnel between the first provider edge device and the second provider edge device, wherein the LSP tunnel information comprises a LSP tunnel identification (ID) of the LSP tunnel and the LSP tunnel information is used by the second provider edge device to establish the pseudo wire;
    determining, by the second provider edge device, the LSP tunnel according to the LSP tunnel ID; and
    after determining the LSP tunnel, establishing, by the second provider edge device, the pseudo wire according to the label mapping message, wherein the established pseudo wire is at least partially carried on the LSP tunnel.

2. The method according to claim 1, wherein the LSP tunnel ID is encapsulated into a pseudo wire forwarding equivalence class type length value (FEC TLV) carried in the label mapping message.

3. The method according to claim 1, wherein the LSP tunnel is a unidirectional LSP tunnel or a bidirectional LSP tunnel.

4. The method according to claim 1, wherein the label mapping message further carries a pseudo wire ID that identifies the established pseudo wire.

5. A device, comprising:
    a receiving unit, configured to receive a label mapping message, wherein the label mapping message carries label switching path (LSP) tunnel information of an LSP tunnel between the device and a sender, wherein the LSP tunnel information comprises a LSP tunnel identification (ID) of the LSP;
    a tunnel matching unit, configured to determine the LSP tunnel according to the LSP tunnel ID; and
    a pseudo wire establishing unit, configured to establish the pseudo wire according to the label mapping message, wherein the established pseudo wire is at least partially carried on the LSP tunnel.

6. The device according to claim 5, wherein the LSP tunnel is a unidirectional LSP tunnel or a bidirectional LSP tunnel.

7. The device according to claim 5, wherein the label mapping message further carries a pseudo wire ID that identifies the established pseudo wire.

8. A system, comprising a first node and a second node, wherein
    the first node is configured to send a label mapping message, wherein the label mapping message comprises label switching path (LSP) tunnel information of an LSP tunnel between the first node and the second node, and wherein the LSP tunnel information comprises a LSP tunnel identification (ID) of the LSP; and
    the second node is configured to receive the label mapping message, determine the LSP tunnel according to the LSP tunnel ID, and establish the pseudo wire according to the label mapping message, wherein the established pseudo wire is at least partially carried on the LSP tunnel.

9. The system according to claim 8, wherein the LSP tunnel is a unidirectional LSP tunnel or a bidirectional LSP tunnel.

10. The system according to claim 8, wherein the label mapping message further carries a pseudo wire ID that identifies the established pseudo wire.

* * * * *